US010051563B2

(12) United States Patent
Shen (10) Patent No.: US 10,051,563 B2
(45) Date of Patent: Aug. 14, 2018

(54) ADAPTIVE AND POWER-CONTROLLABLE WIFI ADJUSTING METHOD AND DEVICE (71) Applicant: ZTE CORPORATION, Shenzhen, Guangdong Province (CN)

(72) Inventor: Shaowu Shen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 57 days.

(21) Appl. No.: 14/904,701

(22) PCT Filed: Nov. 11, 2013

(86) PCT No.: PCT/CN2013/086860
§ 371 (c)(1),
(2) Date: Jan. 13, 2016

(87) PCT Pub. No.: WO2014/166249
PCT Pub. Date: Oct. 16, 2014

(65) Prior Publication Data
US 2016/0157173 A1 Jun. 2, 2016

(30) Foreign Application Priority Data
Jul. 19, 2013 (CN) .......................... 2013 1 0307449

(51) Int. Cl.
H04W 52/02 (2009.01)
H04W 52/14 (2009.01)
(Continued)

(52) U.S. Cl.
CPC ..... *H04W 52/0203* (2013.01); *H04W 52/146* (2013.01); *H04W 52/246* (2013.01);
(Continued)

(58) Field of Classification Search
None
See application file for complete search history.

(56) References Cited

U.S. PATENT DOCUMENTS 5,530,923 A * 6/1996 Heinonen ................. H03F 3/72
330/295
5,815,798 A * 9/1998 Bhagalia ................ G06F 9/546
370/311
(Continued)

FOREIGN PATENT DOCUMENTS

CN 101646228 A 2/2010
CN 101951671 A 1/2011
(Continued)

Primary Examiner — James P Duffy
(74) Attorney, Agent, or Firm — Ling Wu; Stephen Yang; Ling and Yang Intellectual Property (57) ABSTRACT Disclosed are an adaptive power controllable WIFI adjusting method and device, wherein the method includes the following steps that are suitable for a WIFI mobile terminal to execute: determining a WIFI adjustment object as well as an adjustment target value by detecting a current WIFI application environment and/or communication status; obtaining a current value of the WIFI adjustment object by detecting the WIFI adjustment object; comparing the adjustment target value with the current value, and coupling back a comparison result; performing an initial adjustment and a fine adjustment on the WIFI adjustment object according to the coupled-back comparison result, and making a value of the adjustment object obtained after the adjustments consistent with the adjustment target value through precise adjustment, calibration, and correction.

14 Claims, 3 Drawing Sheets (51) Int. Cl.
*H04W 52/24* (2009.01)
*H04W 52/28* (2009.01)
H04W 52/22 (2009.01)
H04W 84/12 (2009.01)

(52) U.S. Cl.
CPC ...... *H04W 52/281* (2013.01); *H04W 52/0251* (2013.01); *H04W 52/0264* (2013.01); *H04W 52/226* (2013.01); *H04W 84/12* (2013.01); *Y02B 60/50* (2013.01)

(56) References Cited

U.S. PATENT DOCUMENTS

| | | | |
|---|---|---|---|
| 2012/0210325 A1 | 8/2012 | de Lind van Wijngaarden et al. | |
| 2013/0116001 A1* | 5/2013 | Wang | H04W 52/367 455/522 |
| 2013/0172039 A1* | 7/2013 | Drucker | H04W 52/288 455/522 |

FOREIGN PATENT DOCUMENTS

| | | |
|---|---|---|
| CN | 102932894 A | 2/2013 |
| WO | WO2010142125 A1 | 10/2010 |

\* cited by examiner

ADAPTIVE AND POWER-CONTROLLABLE WIFI ADJUSTING METHOD AND DEVICE

TECHNICAL FIELD

This technique relates to the field of wireless communications, and more particularly, to an adaptive power controllable WIFI adjusting method and device.

BACKGROUND OF THE INVENTION

With the WIFI being widely used in mobile phones, industries and users have higher and higher requirements on WIFI performance, especially on the WIFI's adaptability to multi-application scenarios and conditions, and some operators have adopted their own guidelines. The WIFI performance is a very important indicator of high-end mobile phones, and it affects the overall performance of a mobile phone and determines the product's success or failure.

At present, the way for controlling WIFI power in a mobile phone is too simple, wherein, generally a nominal power is used to transmit, or it is to transmit indirectly with a certain duty cycle, in this frequent transmitting/receiving transmission mode, constant power transmission brings great challenges to the mobile phone's power consumption, meanwhile, high-power transmission for a long time has some radiation to the human body, and how to design a power control that adaptively adjusts the WIFI step by step based on the WIFI signal strength, the mobile phone's WIFI throughput requirements, and the user's individual demand is a problem that has not been solved yet for the WiFi.

Meanwhile, due to the instability of an internal Power Amplifier (PA) provided in the WIFI chip, the fluctuation of the maximum output power is generally about plus or minus 3 DB, and the fluctuation of the peak power is 5 DB, for the maximum peak power, it can reach 24 DB, and the power output stability has much randomness and a controllable method is needed to make specific adjustments on the actual user power.

Secondly, due to differences in single-board devices and the matching, and the differences in the WIFI calibration, the consistency requirements on the single-board WIFI performance of different batches of boards as well as boards from different manufacturers cannot be changed. The WIFI target transmit powers of different mobile phones may vary widely, how to self-adjust to achieve secure and stable operating power is also a challenge for the production and calibration of each mobile phone, even if the WIFI of each terminal is calibrated and tested in detail, it cannot guarantee that the power of the user's mobile phone is precisely controllable.

Moreover, because there are more and more multimedia functions in the mobile phone, while the battery power supply of the terminal is limited, the long time working of WiFi at a constant power makes the phone usage time largely shortened, and the power consumption is increased rapidly and the terminal will be heated up severely, because the temperature of the phone chip increases, the clock frequency drift increases, and the stability and transmission rate of the WIFI connected terminal will be affected.

In WIFI actual uses, powers in different channels and at different rates will also be different, and the power amplitude will directly affect the key factor, error vector magnitude (EVM), in the transmission performance, and the modulation and demodulation performance of a mobile phone with poor EVM performance will be affected, thereby affecting the channel quality and downloading speed of the WIFI.

Currently, there are the following kinds of mobile phone WIFI power adjustment circuits: 1. internal calibration, control and adjustment; 2. external coupling back, adjustment and control; 3. Direct output no power control. The abovementioned power adjustment result is that the WIFI power is called and output as a constant power in a signaling mode after the calibration, and the power is constant, the accuracy is poor, and the matching is also inconsistent for parasitic capacitors from different manufacturers, which is not conducive to a single adjustment, and does not have the adaptive accurate adjustment capability.

SUMMARY

The present specification invents a novel adaptive power controllable WIFI adjusting method and device.

The purpose of the present document is to provide an adaptive power controllable WIFI adjusting method to solve the problem in the related art that the mode for controlling WIFI power in a mobile phone is single and the phone WIFI cannot always be in the optimal working condition in a variety of application environments, communication status and individual needs.

In accordance with one aspect of the present document, there is provided an adaptive power controllable WIFI adjusting method, comprising the following steps that are suitable for a WIFI mobile terminal to execute:

determining a WIFI adjustment object and an adjustment target value by detecting a current WIFI application environment and/or communication status;

obtaining a current value of the WIFI adjustment object by detecting the WIFI adjustment object;

comparing the adjustment target value with the current value, and coupling back a comparison result;

performing an initial adjustment and a fine adjustment on the WIFI adjustment object according to the coupled-back comparison result, making a value of the adjustment object obtained after the adjustments consistent with the adjustment target value through precise adjustment, calibration and correction.

Preferably, said detecting the current WIFI application environment and/or communication status comprises detecting a wireless configuration information status, an application scenario status, a signal strength status, and a user interaction configuration status.

Preferably, when detecting that the current WIFI application environment and/or communication state is the signal strength state, the adjustment object is determined as a transmission power adjustment.

Preferably, when detecting that the current WIFI application environment and/or communication status is the wireless configuration information status, the application scenario status and the user interaction configuration status, the adjustment object is determined as an output power adjustment.

Preferably, a step before said obtaining a current value of the WIFI adjustment object by detecting the WIFI adjustment object further comprises:

adaptively adjusting the value of the WIFI adjustment object according to the determined WIFI adjustment object and the adjustment target value.

Preferably, the step of performing an initial adjustment and a fine adjustment on the WIFI adjustment object according to the coupled-back comparison result comprises:

according to the coupled-back comparison result, performing the initial adjustment on the WIFI adjustment object, and obtaining an adjustment direction and a power control mode of the current value;

according to the adjustment direction and the power control mode, performing the fine adjustment on the WIFI adjustment object;

wherein, the power control mode comprises an analog power adjustable control mode and a digital power adjustable control mode.

Preferably, the step of making a value of the adjustment object obtained after the adjustments consistent with the adjustment target value through precise adjustment, calibration and correction comprises:

performing the precise adjustment, calibration and correction on the current value of the WIFI adjustment object obtained after the fine adjustment to compare with the adjustment target value, and obtaining a comparison result;

if the comparison result is inconsistency, obtaining an adjustment path and an adjustment amplitude of the adjustment object according to empirical model parameters to perform a voltage signal control adjustment, and making the value of the adjustment object obtained after the adjustment consistent with the adjustment target value.

According to another aspect of the present document, there is provided an adaptive power controllable WIFI adjusting device, comprising following modules that are suitable to be provided in a WIFI mobile terminal:

a determining module, configured to: determine a WIFI adjustment object and an adjustment target value by detecting a current WIFI application environment and/or communication status;

an obtaining module, configured to: obtain a current value of the WIFI adjustment object by detecting the WIFI adjustment object;

a comparing module, configured to: compare the adjustment target value with the current value, and couple back a comparison result;

an adjusting module, configured to: perform an initial adjustment and a fine adjustment on the WIFI adjustment object according to the coupled-back comparison result, and make a value of the adjustment object obtained after the adjustments consistent with the adjustment target value through precise adjustment, calibration and correction.

Preferably, the device further comprises:

a pre-adjusting module, configured to: adaptively adjust the value of the WIFI adjustment object according to the determined WIFI adjustment object and the adjustment target value.

Preferably, the adjusting module comprises:

a first adjusting unit, configured to: perform the initial adjustment on the WIFI adjustment object according to the coupled-back comparison result, and obtain an adjustment direction and a power control mode of the current value, and perform the fine adjustment on the WIFI adjustment object according to the adjustment direction and the power control mode;

a second adjusting unit, configured to: perform the precise adjustment, calibration and correction on the current value of the WIFI adjustment object obtained after the fine adjustment to compare with the adjustment target value, and obtain a comparison result, when the comparison result is inconsistency, obtain an adjustment path and an adjustment amplitude of the adjustment object according to empirical model parameters to perform a voltage signal control adjustment, and make the value of the adjustment object obtained after the adjustment consistent with the adjustment target value;

wherein the power control mode comprises an analog power adjustable control mode and a digital power adjustable control mode.

Compared with the related art, the beneficial effects of the present document are:

1. the embodiment of the present document differs from the single fixed power output mode, it is to control by fully considering the difference in a variety of application states of the mobile phone WIFI to make the phone WIFI transmission quality and performance optimal;

2. the embodiment of the present document is not limited to that it is simple adjustable in the single load pattern, but to achieve that it is dynamic adjustable on the basis of algorithm optimizations, and to make the power control match with the calibration;

3. the embodiment of the present document takes full advantage of the phone's internal circuitry and software, uses the digital-analog adjustable technology and the adaptive feedback coupling calculation design, the adjustable mode is scientific and rational, intelligent and practical;

4. the embodiment of the present document fully considers the WIFI application status of the phone, and combined with the user's requirements on high signal quality, low radiation, low power consumption and high anti-interference, always adjusts the WIFI transmission power to the optimum state to make the wireless connection smoother and more efficient.

PREFERRED EMBODIMENTS OF THE INVENTION

Hereinafter in conjunction with the accompanying drawings, the preferred embodiments of the present document will be described in detail, and it should be understood that the preferred embodiments described below are for illustrating and explaining the present document only and are not intended to limit the present document.

Figure 1:
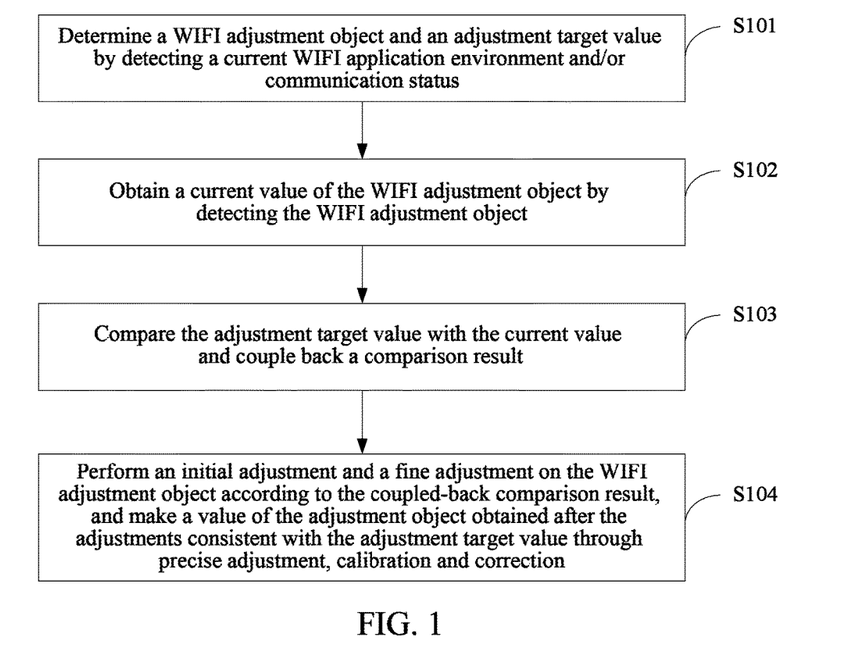
FIG. 1 is a flow chart of an adaptive power controllable WIFI adjusting method provided in an embodiment of the present document.

FIG. 1 shows a flow chart of an adaptive power controllable WIFI adjusting method provided in the present document, as shown in FIG. 1, it comprises the following steps that are suitable for a WIFI mobile terminal to execute:

in step S101, it is to determine a WIFI adjustment object and an adjustment target value by detecting a current WIFI application environment and/or communication status;

in step S102, it is to obtain a current value of the WIFI adjustment object by detecting the WIFI adjustment object;

in step S103, it is to compare the adjustment target value with the current value and couple back a comparison result;

in step S104, it is to perform an initial adjustment and a fine adjustment on the WIFI adjustment object according to the coupled-back comparison result, and make a value of the adjustment object obtained after the adjustments consistent with the adjustment target value through precise adjustment, calibration and correction.

Said detecting the current WIFI application environment and/or communication status comprises detecting a wireless configuration information status, an application scenario status, a signal strength status, and a user interaction configuration status, wherein, when detecting that the current WIFI application environment and/or communication status is the signal strength status, the adjustment object is determined as a transmission power adjustment; when detecting that the current WIFI application environment and/or communication status is the wireless configuration information status, the application scenario status and the user interaction configuration status, the adjustment object is determined as an output power adjustment.

Wherein, the output power adjustment comprises a peak and a maximum average power value and a fluctuation error as well as a mean square value.

In the embodiment of the present document, a step before said obtaining a current value of the WIFI adjustment object by detecting the WIFI adjustment object further comprises: adaptively adjusting the value of the WIFI adjustment object according to the determined WIFI adjustment object and the adjustment target value.

In the embodiment of the present document, the step of performing an initial adjustment and a fine adjustment on the WIFI adjustment object according to the coupled-back comparison result comprises: performing the initial adjustment on the WIFI adjustment object according to the coupled-back comparison result to obtain an adjustment direction and a power control mode of the current value; according to the adjustment direction and the power control mode, performing the fine adjustment on the WIFI adjustment object; wherein, the power control mode comprise an analog power adjustable control mode and a digital power adjustable control mode.

In the embodiment of the present document, the step of making a value of the adjustment object obtained after the adjustments consistent with the adjustment target value through precise adjustment, calibration and correction comprises: precisely adjusting, calibrating and correcting the current value of the WIFI adjustment object obtained after the fine adjustment, and comparing it with the adjustment target value to obtain a comparison result; if the comparison result is that they are inconsistent, then obtaining an adjustment path and an adjustment amplitude of the adjustment object based on empirical model parameters to perform a voltage signal control adjustment, and making the value of the adjustment object obtained after the adjustment consistent with the adjustment target value.

Figure 2:
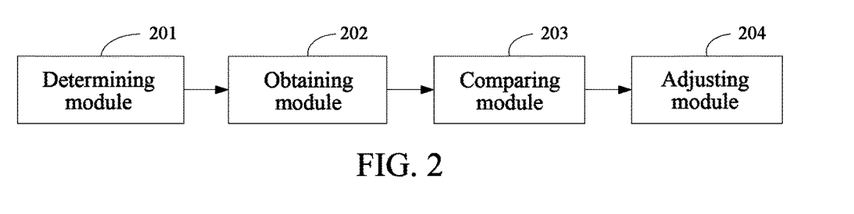
FIG. 2 is a schematic diagram of an adaptive power controllable WIFI adjusting device provided in an embodiment of the present document.

FIG. 2 shows a schematic diagram of an adaptive power controllable WIFI adjusting device provided in the present document, as shown in FIG. 2, it comprises the following modules that are suitable to be provided in the WIFI mobile terminal:

A determining module 201, used to: determine a WIFI adjustment object and an adjustment target value by detecting the current WIFI application environment and/or communication status; an obtaining module 202, used to obtain a current value of the WIFI adjustment object by detecting the WIFI adjustment object; a comparing module 203, used to compare the adjustment target value with the current value and couple back a comparison result; an adjusting module 204, used to perform an initial adjustment and a fine adjustment on the WIFI adjustment object according to the coupled-back comparison result, and make a value of the adjustment object obtained after the adjustments consistent with the adjustment target value through precise adjustment, calibration and correction.

The present document further comprises: a pre-adjusting module, used to adaptively adjust the value of the WIFI adjustment object according to the determined WIFI adjustment object and the adjustment target value.

Wherein, the adjusting module 204 comprises: a first adjusting unit 2041, used to perform the initial adjustment on the WIFI adjustment object according to the coupled-back comparison result, obtain an adjustment direction and a power control mode of the current value, and perform the fine adjustment on the WIFI adjustment object according to the adjustment direction and the power control mode; a second adjusting unit 2042, used to perform the precise adjustment, calibration and correction on the current value of the WIFI adjustment object obtained after the fine adjustment, compare it with the adjustment target value, and obtain a comparison result, when the comparison result is that they are inconsistent, according to the empirical model parameters, obtain an adjustment path and an adjustment amplitude of the adjustment object to perform the voltage signal control adjustment, and make the value of the adjustment object obtained after the adjustment consistent with the adjustment target value; wherein, the power control mode comprises an analog power adjustable control mode and a digital power adjustable control mode.

Figure 3:
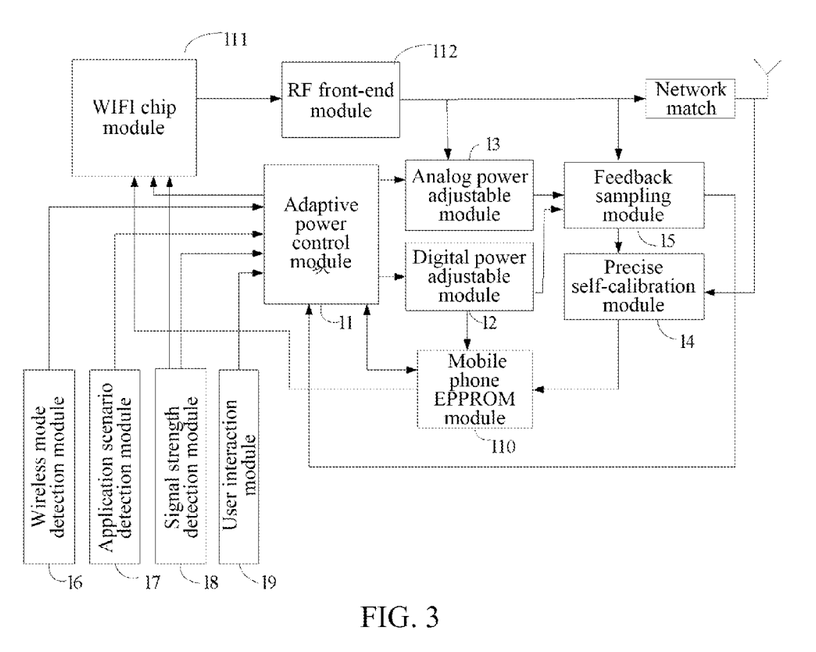
FIG. 3 is a structural diagram of an adaptive power controllable WIFI mobile terminal provided in an example of the present document.

FIG. 3 shows a structural diagram of an adaptive power controllable WIFI mobile terminal provided in an example of the present document, as shown in FIG. 3, the WIFI performance adjustable mobile terminal comprises an adaptive power control module 11, a digital power adjustable module 12, an analog power adjustable module 13, a precise self-calibration module 14, a feedback sampling module 15, a wireless mode detection module 16, an application scenario detection module 17, a signal strength detection module 18, a user interaction module 19 and a mobile phone EPPROM module 110 in the mobile phone itself, a WIFI chip module 111, and RF front-end module 112.

The adaptive power control module 11 is connected to respective application detection modules 16-19 and the digital and analog power adjustable modules 12-13, and is used to make different feedback adjustment response controls to different WIFI adjustments statuses. The control end of the module is the output signals of respective application detection modules 16-19, the output end is the input adjustment signals of the digital and analog power adjustable modules 12-13, the adjustment power amplitude is obtained by calculating and comparing according to the fed-back value, the adaptive power control module 11 comprises a set of digital voltage corresponding tables, outputs a control voltage value to make an adaptive voltage signal output adjustment according to the fed-back result, until they are finally and completely matched.

The digital power adjustable module 12 is connected to the adaptive power control module 11 and the phone EPPROM module 110, and is used in different scenarios to achieve the digital call and adjustment of the WIFI output power value under different needs.

The digital power adjustable module 12 consists of two parts: a non-signaling adjustable module and a signaling adjustable module, the non-signaling adjustable module uses an open loop power control mode to adjust, after the module is enabled, first the initiation loading is performed for the WIFI chip module 111, then it controls the chip to transmit power according to the input command of the adaptive power control module 11 after the initialization, the feedback sampling module 15 samples the received power to feed back to the adaptive power control module 11 for real-time correction. The non-signaling adjustable module is provided with a set of step adjustment arrays, and each step can be 0.5-1 DB, which can be configured and set by users themselves, the array parameters comprise the target power adjustment value, and the actual transmission power value of the phone is changed by changing the target power adjustment value.

The signaling adjustable module first pre-stores a power and adjustment command list, after the WIFI signaling mode is triggered, at the clock beating frequency, the power value under the signaling connection can be changed by calling the command parameter. It is self-adjusted according to the signal strength quality, and the adjustment way needs to be achieved by means of looking up the table and correcting, after correcting the value of the command parameter each time, the feedback sampling module 15 performs real-time sampling, if the adjustment value and the actual sampled value are different, it is re-calibrated and re-corrected by calling the precise self-calibration module 14 until the parameter value under the signaling matches with the target value.

The analog power adjustable module 13 is connected with the adaptive power control module 11 for the analog adjustment control of the WIFI output power value, so as to realize the analog variable output control of the power. The module achieves a 50 ohm characteristic impedance fixed-value adjustment at the center frequency through a variable attenuation circuit and certain model calculations, and the adjustment range is plus or minus 10 DB, basically covering the maximum and minimum power demand values of the WIFI power. The variable attenuation circuit can be achieved through a variable resistor or a multi-way switch plus a fixed value resistor array. After the analog power adjustable module 13 receives an adjustment command and a specific value, it checks and accepts the impedance implementation model and obtains the optimal attenuation circuit value under the calculation of the impedance implementation model, then starts an analog adjustment, and after the adjustment, the feedback sampling module 15 detects and corrects it in real time until it is adjusted to the target power value.

The precise self-calibration module 14 is connected to the phone EPPROM module 110 and the feedback sampling module 15, and is used for the linear high-precision self-calibration and output of the PA output power of the WIFI chip module 111. First, it achieves the precise correction of the power output precision to make the output power stable and flat, meanwhile it assists the accuracy of the power adjustment of the digital and analog power adjustable modules 12-13, because parameters in the phone will change after each power adjustment, and the originally stored values can be corrected after certain calibrations, thereby the power called by the phone can only be accurate. The precise self-calibration module 14 controls the fitting of the output linearization test curve with the theoretical power step linearization curve through the step within a certain range such as 8-24 DB of the transmission power, and adjusts the power control parameters accordingly by the curve fitting result, re-writes the calibration result into the memory of the phone EEPROM 110 for calling in real-time.

The feedback sampling module 15 is connected to the RF front-end module 112, the adaptive power control module 11 and the precise self-calibration module 14, and it is used for sampling and measuring the current power output value, and feeding the sampling result back to the adaptive power control module 11 and the WIFI chip module 111 to achieve the real-time feedback sampling and coupling of the power output. In practice, it is used for sampling and measuring the current value of the output power to couple to the comparison end of the adaptive power control module 11 to realize a feedback control. The sampling signal may be the following two kinds of signals: the first one is the voltage value signal, wherein the analog to digital conversion is realized through a transformer, and the changed power voltage value is transmitted to a feedback detection circuit and then to the adaptive power control module 11 to be compared and controlled; the second one is the coupled power value, wherein a part of the PA output power is sampled and coupled to the operating point adaptive power control module 11 to be compared and calculated, the current power increase or decrease trend is judged, then the power value direction is adjusted according to the changing trend.

The wireless mode detection module 16 is connected to the adaptive power control module 11 and is used to detect the current status of wireless configuration information, such as channel, speed, protocol, code stream, of the mobile phone, and perform an offset adjustment for different configuration statuses, and transmit the adjustment result to the adaptive power control module 11 to achieve different adjustment modes.

In the WIFI first booting phase, firstly the channel scanning mechanism is enabled, and channel frequencies that exceed the power target range are finely adjusted by detecting power error offset values of high, medium and low channels (2412 MHz/2437 MHz/2472 MHz), and the fine adjustment result is written into the corresponding power parameter register, in the following use, firstly the calibration parameter in this register is called as the initial reference power. After connecting to a fixed AP, it is to monitor the power error and EVM error value of the connecting channel through a power sampler in real time and compare it with the target reference value, and if an offset occurs, the wireless signal detection module feeds back a signal to the adaptive power control module 11 to adjust to a predetermined state according to the feedback. Other radio signal detection and adjustment, such as the transmission rate adjustment (e.g. 1M/11M/54M/72M/433M), the radio transmission protocol adjustment (802.11b/g/n/a/ac), the frequency bandwidth adjustment (e.g. 20 MHZ/40 MHZ/80 MHZ/160 MHZ), and the antenna MIMO and code stream adjustment way is similar to the above channel adjustment way.

The application scenario detection module 17 is connected to the adaptive power control module 11, and is used for monitoring the current state and user needs status of the phone WIFI in real time. It is achieved through a multi-way switch, and the input signal is the output enabling signal of each sensor, and the output signal is the adaptive control enabling signal. If the current environment state of the mobile phone is unimpeded open space, the application scenario detection module 17 detects that the input signal is an S1-active high-level signal, if there is a strong obstacle control, the input signal is an S0-active low-level signal; if it is in the energy saving mode, it is a T1-active high-level signal, if it is in the strongest signal mode, it is a T0-active low-level signal, similarly, for the high-definition display application DISPLAY or high-speed P2P (peer-to-peer) transmission applications, the application scenario detection module 17 will make instantaneous detection and send control signals to the adaptive power control module 11 to make a real-time power output adjustment.

The signal strength detection module 18 is connected with the WIFI baseband processing circuit in the WIFI chip module 111 and the adaptive power control circuit 11 and is used to detect the current WIFI received signal strength as well as the signal intensity fluctuation stability in real time, and repeatedly detect the signal strength stability, so as to adjust it in real time when the power error becomes big, and enhance the stability and efficiency of the wireless connection. Under the condition that the phone works in weak signals or the multipath fading is relatively serious, the WIFI's receiving sensitivity would drop dramatically, while the accurate power and modulation performance can greatly improve the IQ signal demodulation capability and minimize the EVM distortion. By sampling in real time the RSSI (Received Signal Strength Indication) signal fed back by the WIFI in the Baseband, when the signal weakens, the system automatically improves the accuracy of the reference power, reduces the frequency error, and increases the signal strength.

The user interaction module 19 is connected to the adaptive power control module 11, and is used by the users to make interactive selections for applications such as the needs of different groups, voice or data transmission throughput performance requirements, low Specific Absorption Rate (SAR) low radiation requirements or high efficient power mode requirements, the mobile phone completes the power output adjustment according to different requirements. If the user requires the low-SAR Eco mode, the PA's output power can be moderately reduced; if the user feels that the Internet access is too slow, the user can require to appropriately adjust the PA output power, improve the channel quality, so that the power can be close to the optimum power point;

The phone EPPROM module 110 is connected to the WIFI chip module 111 and the precise self-calibration module 14 to realize the storage of power calibration data.

The WIFI chip module 111 is connected to the adaptive power control module 11 and is used to detect the current signal amplitude RSSI of the phone WIFI. The RSSI can refer to the WIFI, that is, the RF front-end module 112 and the WIFI antenna are taken as a whole, considering the matching performance of the antenna to the RF front-end module 112, the chip receiving link quality, signal strength and stability is determined in baseband, and the WIFI clock matching is self-calibrated through the signal amplitude strength, the load adjustment control is performed by the adaptive power control module 11 with the calibration result. When the WIFI signal is relatively weak, it is to detect the current power error and its stability, and adjust them into the target value error minimized range.

The RF front-end module 112 is connected to the WIFI antenna in the phone and the WIFI chip module 111, to achieve circuit filtering and impedance matching of the chip output to the antenna.

Figure 4:
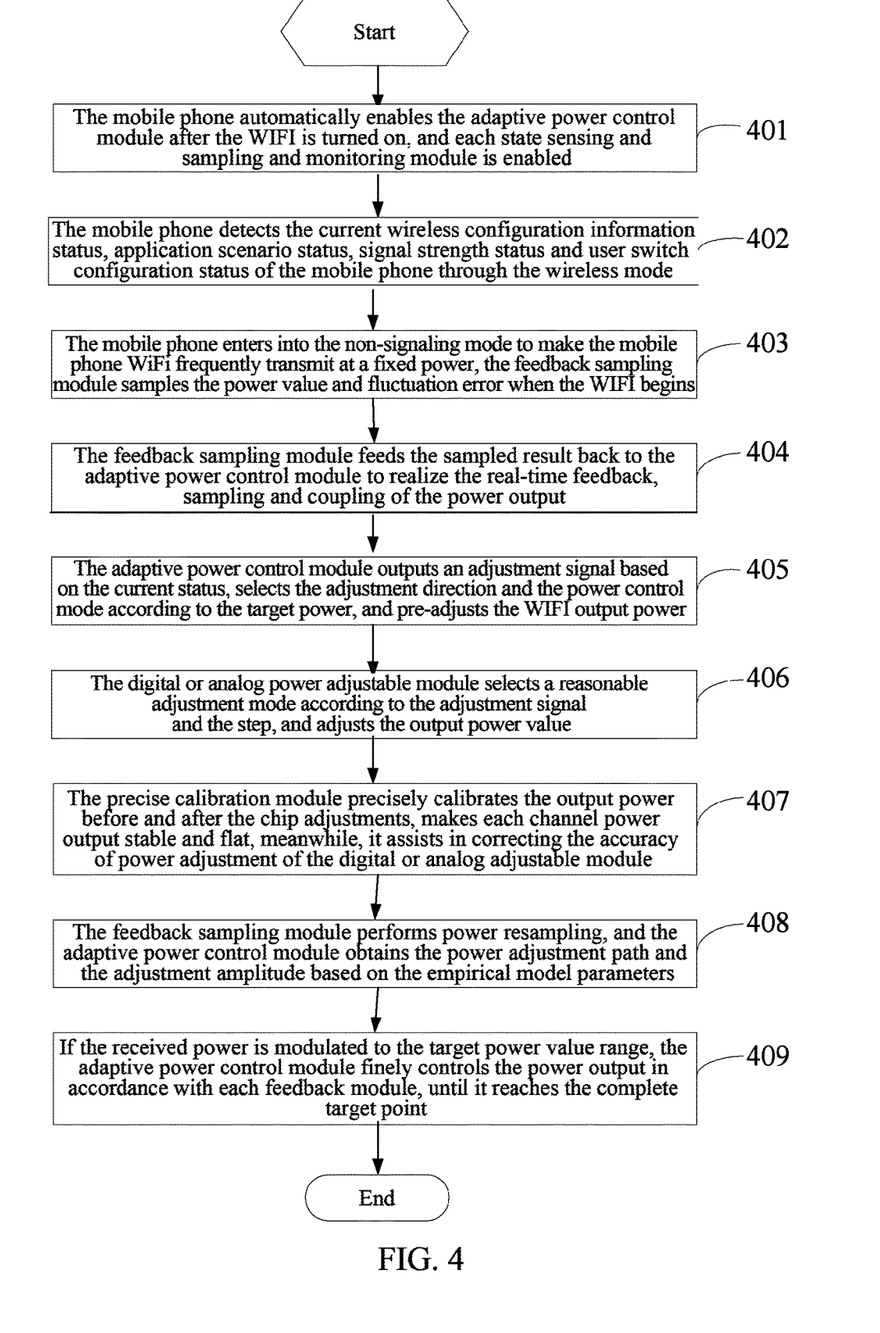
FIG. 4 is a work flow chart of an adaptive WIFI power controllable circuit provided in an example of the present document.

FIG. 4 shows an operating flow chart of an adaptive power controllable WIFI mobile terminal according to the present document, as shown in FIG. 4, the method of the mobile terminal in the present document comprises the following steps:

in step 401, the mobile phone automatically enables the adaptive power control module after the WIFI is turned on, and each state sensing and sampling and monitoring module is enabled;

in step 402, the mobile phone detects the current wireless configuration information status, application scenario status, signal strength status and user switch configuration status of the mobile phone through the wireless mode;

in step 403, the mobile phone enters into the non-signaling mode, and the mobile phone takes a certain target power as the reference value to frequently transmit at a fixed power, the feedback sampling module samples the power value and fluctuation error when the WIFI starts;

in step 404, the feedback sampling module feeds the sampled result back to the adaptive power control module to realize the real-time feedback, sampling and coupling of the power output, compares the actual sampled measurement value with the target value, and feeds back a comparison result to the adaptive power control module to realize a closed loop feedback control adjustment;

in step 405, the adaptive power control module outputs an adjustment signal based on the current status, selects the adjustment direction and the power control mode according to the target power, pre-adjusts the WIFI output power to make it work within the correct power range;

in step 406, the digital or analog power adjustable module selects a reasonable adjustment mode according to the adjustment signal and the step, and adjusts the output power value;

in step 407, the precise calibration module precisely calibrates the output power before and after the chip adjustments, makes each channel power output stable and flat, meanwhile, it assists in correcting the accuracy of power adjustment of the digital/analog adjustable module;

in step 408, the feedback sampling module performs power resampling, if the actual power value does not match with the target power value or their stability factors are too low, which indicates that the adjustment modes mismatch the parameters, the adaptive power control module obtains the power adjustment path and the adjustment amplitude based on the empirical model parameters, feeds them back to the digital/analog controllable power module to control and output the voltage signal;

in step 409, If the received power is modulated to the target power value range, the adaptive power control module finely controls the power output in accordance with each feedback module, until it reaches the complete target point, after a round of adjustment completes, the adaptive control module receives in real time dynamic information coming from the four detection modules, and is ready for the next round of adaptive adjustment.

Although the present document has been described in detail in the above, the present document is not limited to this, those skilled in the art can make various modifications according to the principle of the present document. Therefore, all modifications made in accordance with the principle of the present document should be interpreted as falling into the protection scope of the present document.

INDUSTRIAL APPLICABILITY

In summary, the embodiment of the present document has the following beneficial effects:

The embodiment of the present document makes the WIFI transmission performance of a mobile phone adaptively adjusted according to the needs and performance through an adaptive power control module, makes the power performance of the mobile terminal WIFI self-adjusted in a variety of application environments and conditions to ensure that the phone WIFI works with the optimal performance at any time, and the uploading and downloading throughputs reach the highest, while the external influences and human safety radiation are minimized.

What is claimed is:

1. An adaptive power controllable WIFI adjusting method, comprising the following steps that are suitable for a WIFI mobile terminal to execute:

determining a WIFI adjustment object and an adjustment target value by detecting a wireless configuration information status, an application scenario status, a signal strength status, and a user interaction configuration status;

obtaining a current value of the WIFI adjustment object by detecting the WIFI adjustment object;

comparing the adjustment target value with the current value, and coupling back a comparison result;

performing an initial adjustment and a fine adjustment on the WIFI adjustment object according to the coupled-back comparison result, making a value of the adjustment object obtained after the adjustments consistent with the adjustment target value through precise adjustment, calibration and correction;

wherein, the step of making a value of the adjustment object obtained after the adjustments consistent with the adjustment target value through precise adjustment, calibration and correction comprises:

performing the precise adjustment, calibration and correction on the current value of the WIFI adjustment object obtained after the fine adjustment to compare with the adjustment target value, and obtaining a comparison result;

if the comparison result is inconsistency, obtaining an adjustment path and an adjustment amplitude of the adjustment object according to empirical model parameters to perform a voltage signal control adjustment, and making the value of the adjustment object obtained after the adjustment consistent with the adjustment target value.

2. The method of claim 1, wherein, when the signal strength state is detected, the adjustment object is determined as a transmission power adjustment.

3. The method of claim 1, wherein, when the wireless configuration information status, the application scenario status and the user interaction configuration status are detected, the adjustment object is determined as an output power adjustment.

4. The method of claim 3, wherein, the output power adjustment comprises a peak and a maximum average power value and a fluctuation error as well as a mean square value.

5. The method of claim 1, wherein, a step before said obtaining a current value of the WIFI adjustment object by detecting the WIFI adjustment object further comprises:

adaptively adjusting the value of the WIFI adjustment object according to the determined WIFI adjustment object and the adjustment target value.

6. The method of claim 1, wherein, the step of performing an initial adjustment and a fine adjustment on the WIFI adjustment object according to the coupled-back comparison result comprises:

according to the coupled-back comparison result, performing the initial adjustment on the WIFI adjustment object, and obtaining an adjustment direction and a power control mode of the current value;

according to the adjustment direction and the power control mode, performing the fine adjustment on the WIFI adjustment object;

wherein, the power control mode comprises an analog power adjustable control mode and a digital power adjustable control mode.

7. An adaptive power controllable WIFI adjusting device, comprising hardware performing instructions stored in a non-transitory computer readable medium which executes steps in following modules in a WIFI mobile terminal:

a determining module, configured to: determine a WIFI adjustment object and an adjustment target value by detecting a wireless configuration information status, an application scenario status, a signal strength status, and a user interaction configuration status;

an obtaining module, configured to: obtain a current value of the WIFI adjustment object by detecting the WIFI adjustment object;

a comparing module, configured to: compare the adjustment target value with the current value, and couple back a comparison result;

an adjusting module, configured to: perform an initial adjustment and a fine adjustment on the WIFI adjustment object according to the coupled-back comparison result, and make a value of the adjustment object obtained after the adjustments consistent with the adjustment target value through precise adjustment, calibration and correction;

wherein, the hardware performing the instructions stored in the non-transitory computer readable medium executes steps in the adjusting module comprises executing steps in following units:

a first adjusting unit, configured to: perform the initial adjustment on the WIFI adjustment object according to the coupled-back comparison result, and obtain an adjustment direction and a power control mode of the current value, and perform the fine adjustment on the WIFI adjustment object according to the adjustment direction and the power control mode;

a second adjusting unit, configured to: perform the precise adjustment, calibration and correction on the current value of the WIFI adjustment object obtained after the fine adjustment to compare with the adjustment target value, and obtain a comparison result, when the comparison result is inconsistency, obtain an adjustment path and an adjustment amplitude of the adjustment object according to empirical model parameters to perform a voltage signal control adjustment, and make the value of the adjustment object obtained after the adjustment consistent with the adjustment target value;

wherein the power control mode comprises an analog power adjustable control mode and a digital power adjustable control mode.

8. The device of claim 7, wherein the hardware performing the instructions stored in the non-transitory computer readable medium further executes steps in a following module:

a pre-adjusting module, configured to: adaptively adjust the value of the WIFI adjustment object according to the determined WIFI adjustment object and the adjustment target value.

9. An adaptive power controllable WIFI mobile terminal, comprising an adaptive power control module, a digital power adjustable module, an analog power adjustable module, a precise self-calibration module, a feedback sampling module, a wireless mode detection module, an application scenario detection module, a signal strength detection module, a user interaction module and a mobile phone EPPROM module, a WIFI chip module, and RF front-end module;

wherein, the adaptive power control module is configured to connect to the wireless mode detection module, the application scenario detection module, the signal strength detection module and the user interaction module; and connect to the digital power adjustable module and the analog power adjustable module; and is configured to make different feedback adjustment response controls to different WIFI adjustments statuses;

the digital power adjustable module is configured to connect to the adaptive power control module and the phone EPPROM module, and perform digital call and adjustment of WIFI output power value under different needs in different scenarios;

the analog power adjustable module is configured to connect with the adaptive power control module for the analog adjustment control of the WIFI output power value, and realize the analog variable output control of the power;

the precise self-calibration module is configured to connect to the phone EPPROM module and the feedback sampling module, and perform a linear high-precision self-calibration and output of the PA output power of the WIFI chip module;

the feedback sampling module is configured to connect to the RF front-end module, the adaptive power control module and the precise self-calibration module, and the feedback sampling module is further configured to sample and measure current power output value, and feed a sampling result back to the adaptive power control module and the WIFI chip module to achieve real-time feedback sampling and coupling of the power output;

the wireless mode detection module is configured to connect to the adaptive power control module, detect current status of wireless configuration information, perform an offset adjustment for different configuration statuses, and transmit the adjustment result to the adaptive power control module to achieve different adjustment modes;

the application scenario detection module is configured to connect to the adaptive power control module, and monitor current state of the phone WIFI and user needs status;

the signal strength detection module is configured to connect with a WIFI baseband processing circuit in the WIFI chip module and the adaptive power control module, detect current WIFI received signal strength as well as signal intensity fluctuation stability;

the user interaction module is configured to connect to the adaptive power control module, and further configured for user to make interactive selections for applications;

the phone EPPROM module is configured to connect to the WIFI chip module and the precise self-calibration module, and store of power calibration data;

the WIFI chip module is configured to connect to the adaptive power control module, and detect the current signal amplitude RSSI of the phone WIFI;

the RF front-end module is configured to connect to WIFI antenna in the terminal and the WIFI chip module, and achieve circuit filtering and impedance matching of the chip output to the antenna.

10. The adaptive power controllable WIFI mobile terminal according to claim 9, wherein the control end of the adaptive power control module is the output signals of the wireless mode detection module, the application scenario detection module, the signal strength detection module and the user interaction module; the output end of the adaptive power control module is the input adjustment signals of the digital power adjustable module and the analog power adjustable module;

the adjustment power amplitude of the input adjustment signal is obtained by calculating and comparing according to a fed-back value from the feedback sampling module.

11. The adaptive power controllable WIFI mobile terminal according to claim 9, wherein the digital power adjustable module comprises: a non-signaling adjustable module and a signaling adjustable module;

wherein the non-signaling adjustable module is configured to use an open loop power control mode to adjust; after the non-signaling adjustable module is enabled, the non-signaling adjustable module is further configured to perform the initiation loading for the WIFI chip module firstly, then control the WIFI chip to transmit power according to the input command of the adaptive power control module after the initialization;

the signaling adjustable module is configured to pre-store a power and adjustment command list; after the signaling adjustable module is triggered, at the clock beating frequency, the signaling adjustable module is further configured to change the power value under the signaling connection by calling the command parameter.

12. The adaptive power controllable WIFI mobile terminal according to claim 9, wherein the analog power adjustable module is further configured to achieve a 50 ohm characteristic impedance fixed-value adjustment at the center frequency through a variable attenuation circuit and a impedance implementation model calculations, and the adjustment range is plus or minus 10 DB.

13. The adaptive power controllable WIFI mobile terminal according to claim 12, wherein the variable attenuation circuit is configured to be achieved through a variable resistor or a multi-way switch plus a fixed value resistor array.

14. The adaptive power controllable WIFI mobile terminal according to claim 12, wherein, after the analog power adjustable module receives an adjustment command and a specific value, the analog power adjustable module is further configured to check the impedance implementation model and obtains an optimal attenuation circuit value according to the impedance implementation model, then start an analog adjustment; and according to a fed-back value from the feedback sampling module, the analog power adjustable module is further configured to correct the optimal attenuation circuit value until the target power value is met.

* * * * *